United States Patent [19]
Blatter

[11] Patent Number: 6,035,994
[45] Date of Patent: Mar. 14, 2000

[54] CONVEYOR

[75] Inventor: René Blatter, Commugny, Switzerland

[73] Assignee: Kustner Industries S.A., Meyrin, Switzerland

[21] Appl. No.: 09/066,096

[22] Filed: Apr. 23, 1998

[30]  Foreign Application Priority Data

Apr. 29, 1997 [CH] Switzerland ............................. 1002/97

[51] Int. Cl.⁷ ............................ B65G 47/29; B65G 23/38
[52] U.S. Cl. .................... 198/343.1; 198/792; 198/462.3
[58] Field of Search ............................... 198/343.1, 812, 198/460.2, 462.3, 792

[56]  References Cited

U.S. PATENT DOCUMENTS

| | | | |
|---|---|---|---|
| 2,551,080 | 5/1951 | Allen et al. | 198/343.1 |
| 5,191,965 | 3/1993 | Scheid | 198/460.2 |
| 5,322,154 | 6/1994 | Lenherr | 198/812 |
| 5,442,985 | 8/1995 | Ito | 198/812 |

FOREIGN PATENT DOCUMENTS 27 30 864 A1  1/1979  Germany.

Primary Examiner—William E. Terrell
Assistant Examiner—Mark A. Deuble
Attorney, Agent, or Firm—Skjerven, Morrill MacPherson, Franklin & Friel LLP; Alan H. MacPherson

[57]  ABSTRACT

The conveyor comprises a conveyor belt (5), two main drums (R1,R4) around which the conveyor belt forms a main loop, two auxiliary drums (R2,R3) mounted between the main drums and around which the conveyor belt forms a secondary loop, and two auxiliary rolls (R5,R6) close together and forming a return for the upper strand of the conveyor belt towards each of the auxiliary drums. The main drum (R1) located at the end where objects begin to be conveyed is shifted as one back and forth parallel to the conveyor belt in such a way that as it shifts backward, the conveyor belt has a section (S1) with zero speed. The forward travel is such that an object placed on the zero-speed section catches up with the objects lying on that section of the belt that is traveling at constant speed.

3 Claims, 3 Drawing Sheets

CONVEYOR

FIELD OF THE INVENTION

The subject of the invention is a conveyor comprising an endless conveyor belt driven at constant speed and passing over a pair of fixed drums and over a pair of drums that can move in translation parallel to the conveyor belt and means of driving the mobile drums back and forth driving these drums, in the opposite direction to the travel of the belt, at a speed equal to half of the constant speed of the belt in such a way that the speed of one section of the belt relative to a fixed point is temporarily equal to zero.

PRIOR ART

A conveyor of this kind is known from German patent application 2 730 864. According to a first embodiment, the variable-speed section of the conveyor belt extends between the two mobile drums. In this case, the variable-speed section travels relative to the fixed point. According to a second embodiment, the variable-speed section extends between two fixed-axle drums, the mobile drums being close together and situated in a plane parallel to the plane containing the axles of the fixed drums, between this plane and the plane containing the axles of a second pair of fixed-axle drums, the conveyor belt achieving a change in direction through 180° as it passes over each of the drums. In this case, the variable-speed section of belt is fixed relative to the fixed point.

A conveyor of this kind allows collections of objects, particularly piles of objects, to be deposited uniformly over the variable-speed section of conveyor belt when the relative speed of this section is zero. Plant of this kind would, in particular, allow the depositing of piles of food products in slices or slabs prewrapped individually in a film of synthetic material with a view to conveying them to a packaging machine which overwraps the piles. It would thus be possible to overcome the existing precaution that consists in coating the films that wrap the slices with egg white or food-grade oil acting as a glue for preventing the wrapped slices from sliding over one another and thus avoid any deposition of this sticky product on the components of the transfer plant.

To achieve an automatic packaging plant, it is not, however, enough to combine a conveyor belt according to the prior art with a second conveyor belt traveling at constant speed and onto which the piles deposited on the variable-speed section of the first conveyor belt would be transferred. The problem here is that to carry out automatic packaging, it is necessary for the piles driven by the conveyor belt toward the overwrapping station to follow after one another at regular intervals.

SUMMARY OF THE INVENTION

The specific object of the present invention is to solve this problem, that is to say to ensure a uniform space between the objects or piles of objects conveyed at constant speed.

To this end, the conveyor according to the invention is one wherein the conveyor belt forms a main loop between one of the fixed drums and one of the mobile drums and, within the main loop, a secondary loop between the other fixed drum and the other mobile drum; and wherein said conveyor further comprises two auxiliary rolls close together situated above and between the drums of the secondary loop and forming return rolls for the upper strand of the conveyor belt toward the drums of the auxiliary loop and dividing the upper strand of the conveyor belt into two coplanar sections, one of variable speed and the other of fixed speed, said rolls also being able to move as one, in translation parallel to the conveyor belt; wherein the means of driving the translationally mobile drums back and forth are arranged in such a way that in a first phase the mobile drums are shifted in the opposite direction to the conveying at a speed equal to half the constant speed of the conveyor belt, then in a second phase, in the direction of conveying with an increase, then a decrease in speed, so that objects can be deposited on a zero-speed section, then driven at the constant speed; and wherein the conveyor further comprises means of driving the auxiliary rolls back and forth, these means being synchronized with the means for driving the mobile drums back and forth, in such a way that the shifting of the auxiliary rolls in the direction of travel of the conveyor belt, at the same time as driving the mobile drums in the same direction, allows the objects driven by the variable-speed section to catch up with the objects driven by the constant-speed section.

The forward travel of the mobile rolls also results in a shortening of the rear part of that section of the conveyor belt that is traveling at constant speed and in a corresponding lengthening of the variable-speed section, which means that the objects lying at the front end of the variable-speed section can catch up with the objects lying on the constant-speed section of belt.

The conveyor according to the invention may be equipped with a single motor rotating at constant speed, the shiftable rolls and drums being mounted on carriages driven back and forth, via a mechanical transmission, by said motor.

The mechanical transmission may simply consist of a pair of cams, of levers driven by these cams, and of connecting rods connecting these levers to the carriages. These cams control not only the back and forth movement of the carriages, but their shape determines the acceleration and deceleration needed to allow the objects, particularly piles, driven at constant speed by that section of the conveyor belt that is traveling at constant speed to catch up.

BRIEF DESCRIPTION OF THE DRAWINGS

The appended drawing depicts, by way of example, one embodiment of the invention.

DESCRIPTION OF THE PREFERRED EMBODIMENT(S)

Figure 1:
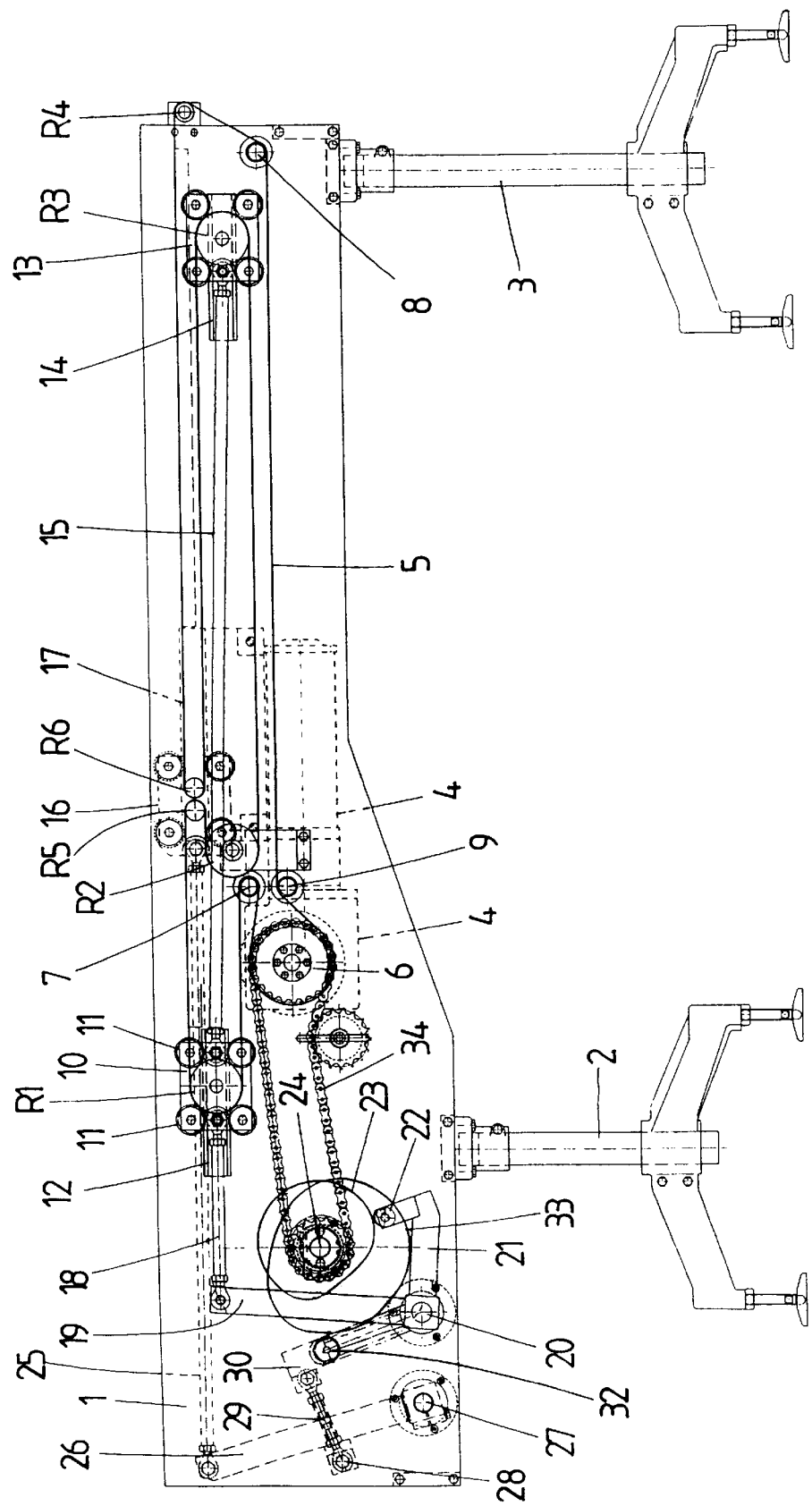
FIG. 1 is a side view of the conveyor belt.

The conveyor comprises a structure 1 mounted on two adjustable tripod supports 2 and 3. The structure 1 has a single motor 4 (associated with reduction gearing) driving a conveyor belt 5. This conveyor belt 5 is led essentially over two main drums R1 and R4, two auxiliary drums R2,R3 and two auxiliary rolls R5,R6. These drums and rolls are shown here because they will play an essential part in describing the operation of the conveyor. More specifically, the conveyor belt 5, considered in its direction of travel starting from the drive drum 6 driven by the motor, passes in turn, forming a number of loops, over a return 7, the main drum R1, the auxiliary roll R5, the auxiliary drum R2, the auxiliary drum R3, the auxiliary roll R6, the main drum R4, a return 8 and a tensioning roller 9.

The main drum R1 is mounted on a carriage 10 fitted with four pairs of rollers 11 guiding the carriage 10 along a horizontal section of rail 12. Likewise, the auxiliary drum R3 is mounted on a carriage 13 identical to the carriage 10 and traveling along a horizontal section of rail 14. The carriages 10 and 13 are joined together by a rigid bar 15 which constitutes a coupling between the carriages. The auxiliary rolls R5 and R6 are also mounted, side by side, in the same horizontal plane, on a third carriage 16 identical to the carriages 10 and 13 and traveling, like them, along a horizontal section of rail 17.

The carriage 10 is connected by a connecting rod 18 to the end of an arm 19 articulated about a fixed axle 20 by its other end rigidly secured to a second cranked arm 21 equipped at its end with a follower 22 pressing against the periphery of a cam 23 mounted so that it can rotate about an axle 24.

Similarly, the carriage 16 is connected by a connecting rod 25 to the end of an arm 26 articulated to the structure about an axle 27, this arm 26 being itself connected, at an intermediate point 28, by a connecting rod 29, to a lever 30 articulated about the axle 20 and fitted with a follower 32, via which it presses on a second cam 33 which also rotates as one with the shaft 24 and is arranged parallel to the cam 23.

The shaft 24 is driven by the motor 4, via a chain transmission 34 and therefore rotates at constant speed.

The rotation of the cam 23 therefore has the effect of imparting a back and forth movement to the carriages 10 and 13, while the cam 33 has the effect of driving the carriage 16 back and forth. The shape of the cams 23 and 33 is such that the conditions which will be described below with reference to FIGS. 2 to 7 are obtained.

For reasons of convenience in describing the operation of the machine, the instant t0 will be chosen to be the moment after which the piles of slices may be deposited on the conveyor belt.

At the instant t0 (FIG. 2), the profile of the cam 23 is such that the carriages 10 and 13 are traveling to the left, that is to say in the opposite direction to the conveying, at a speed V3=V2/2, V2 being the constant speed of travel of the conveyor belt. This backward movement of the drums R1 and R3 at the speed V3 continues from the instant t0 until the instant t1.

While the drums R1 and R3 are moving backward at the speed V3, the section S1 of the conveyor belt that lies immediately ahead of the drum R1, is given a speed V1 equal to zero relative to the piles P lying on this section S. These piles P can then be deposited on the section S1 as if the conveyor belt were not moving.

Figure 3:
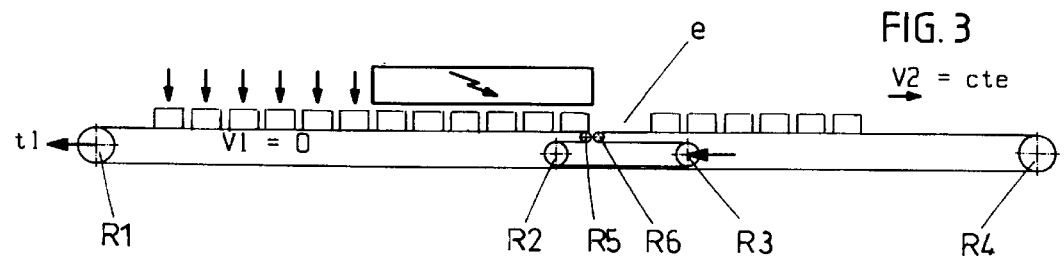
Figure 4:
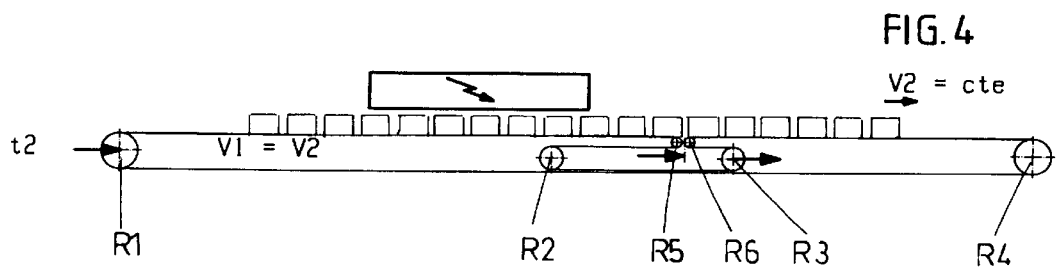
Figure 5:
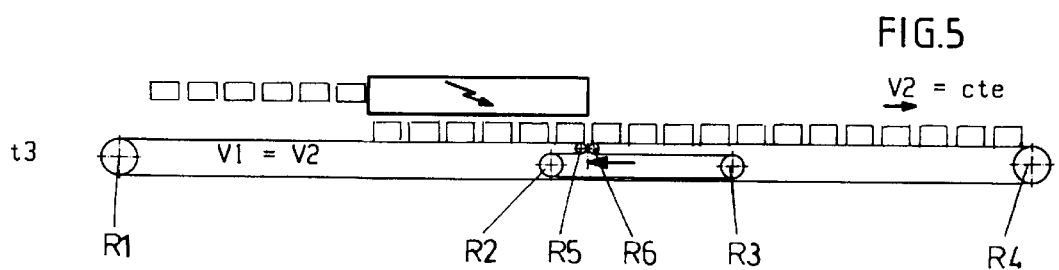

FIG. 3 depicts the conveyor at the time t1. The piles P are resting on the section S1 of the conveyor belt.

Figure 2:
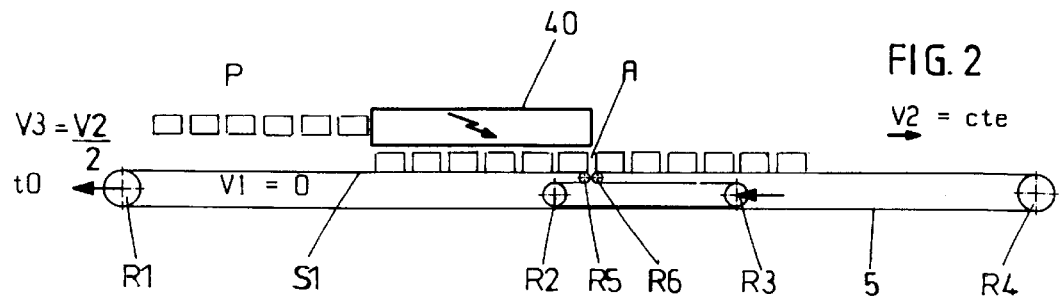
FIGS. 2 to 5 diagrammatically depict four successive phases in the operation of the conveyor belt.

It can be seen that the section S1 extends as far as the roll R5, which means that the piles situated under a device 40 intended for electrostatically charging the piles are also stationary. The piles situated ahead of the roll R6, that is to say ahead of the region A, FIG. 2, are, on the other hand, driven at the speed V2. These piles therefore get ahead of the piles on the section S1, this lead being embodied by the space e visible in FIG. 3.

Figure 6:
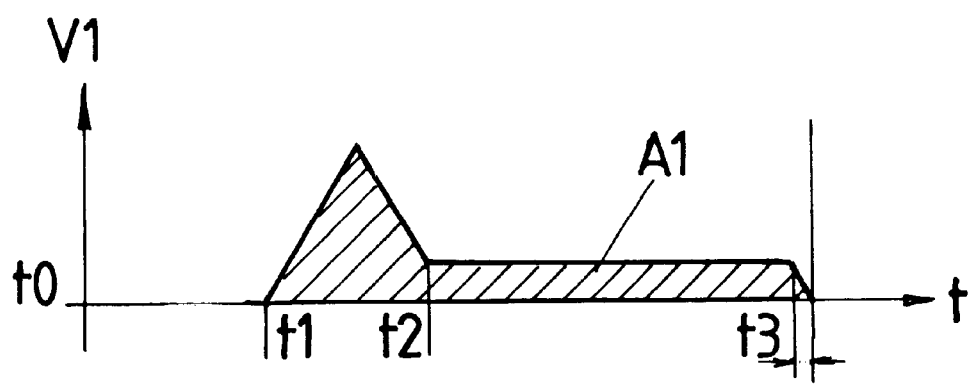
FIGS. 6 and 7 are diagrammatic depictions of the speed of the two sections of the conveyor belt during the various operating phases depicted in FIGS. 2 to 5.
Figure 7:
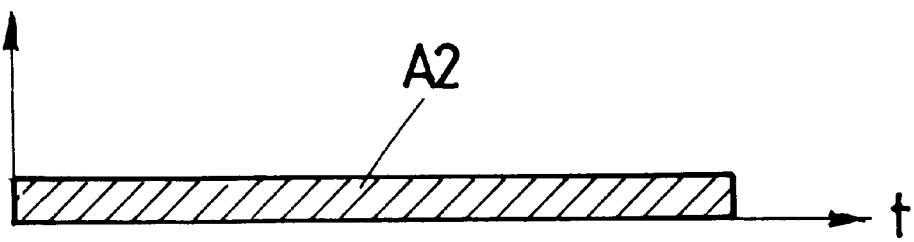

In order to catch up, the piles P are driven at a higher speed, V1 higher than V2, which reaches a maximum, to drop back down to the value V2 at the instant t2, as depicted in FIG. 6.

To eliminate the space e, it is not, however, enough to bring the speed of the section S1 of the belt down to the speed V2, it is also necessary to shift the auxiliary rolls R5 and R6 forward. This shifting is ensured by the cam 33. At the time t2, catching up is finished and the moving piles constitute a uniform sequence. During this part of the cycle, prior to the time t3, the cam 33 returns the rolls R5 and R6 backward, into the position depicted in FIG. 2.

The end of the cycle, from the instant t3, is characterized by the moving and accelerating of the carriages 10 and 13, that is to say of the drums R1 and R3, backward until the speed V1 drops back down to zero, then the cycle begins afresh. The integral of the curve V1 over one cycle, depicted by the area A1, has to be equal to the integral of the curve V2 depicted by the area A2.

Thus, with just one motor rotating at constant speed and driving a conveyor belt at constant speed it is possible, using a set of carriages and a set of cams, to obtain an instantaneous stoppage of one section of the conveyor belt and to allow the piles deposited on the stationary section of the conveyor belt to catch up with the piles driven at constant speed by the conveyor belt.

I claim:

1. A conveyor comprising an endless conveyor belt driven at constant speed and passing over a pair of fixed drums (R2,R4) and over a pair of drums (R1,R3) that can move in translation parallel to the conveyor belt and means of driving the mobile drums back and forth driving these drums, in the opposite direction to the travel of the belt, at a speed equal to half of the constant speed of the belt in such a way that the speed of one section of the belt relative to a fixed point is temporarily equal to zero, wherein the conveyor belt forms a main loop between one of the fixed drums (R4) and one of the mobile drums (R1) and, within the main loop, a secondary loop between the other fixed drum (R2) and the other mobile drum (R3); and wherein said conveyor further comprises two auxiliary rolls (R5,R6) close together situated above and between the drums (R2,R3) of the secondary loop and forming return rolls for the upper strand of the conveyor belt toward the drums of the auxiliary loop and dividing the upper strand of the conveyor belt into two coplanar sections, one of variable speed and the other of fixed speed, said rolls also being able to move as one, in translation parallel to the conveyor belt; wherein the means of driving the translationally mobile drums (R1,R3) back and forth are arranged in such a way that in a first phase the mobile drums are shifted in the opposite direction to the conveying at a speed equal to half the constant speed of the belt, then in a second phase, in the direction of conveying with an increase, then a decrease in speed, so that objects (P) can be deposited on a zero-speed section, then driven at the constant speed; and wherein the conveyor further comprises means of driving the auxiliary rolls (R5,R6) back and forth, these means being synchronized with the means for driving the mobile drums back and forth, in such a way that the shifting of the auxiliary rolls in the direction of travel of the conveyor belts, at the same time as driving the mobile drums in the same direction, allows the objects driven by the variable-speed section to catch up with the objects driven by the constant-speed section.

2. The conveyor as claimed in claim 1, which comprises a single motor (4) rotating at constant speed, and wherein the drums (R1,R3) and the rolls (R5,R6) that can move in translation are mounted on carriages (10,13,16) driven by said motor, via a mechanical transmission (34,23,33).

3. The conveyor as claimed in claim 2, wherein the mechanical transmission consists of a pair of cams (23,33), of levers (19,21,26,30) driven by these cams, and of connecting rods (18,25) connecting these levers to the carriages.

* * * * *